United States Patent
Tseng et al.

(10) Patent No.: US 8,018,534 B2
(45) Date of Patent: Sep. 13, 2011

(54) TELEVISION CARD WITH REMOTE CONTROL MODULE

(75) Inventors: Chien-Lung Tseng, Chung Ho (TW); Chao-Jung Chen, Chung Ho (TW); Shen-Chuan Kao, Chung Ho (TW); Kao-Yi Shen, Chung Ho (TW)

(73) Assignee: Avermedia Technologies, Inc., Taipei Hsien (TW)

( * ) Notice: Subject to any disclaimer, the term of this patent is extended or adjusted under 35 U.S.C. 154(b) by 966 days.

(21) Appl. No.: 11/943,039

(22) Filed: Nov. 20, 2007

(65) Prior Publication Data

US 2009/0002571 A1  Jan. 1, 2009

(30) Foreign Application Priority Data

Jun. 27, 2007 (TW) .............................. 96123373 A

(51) Int. Cl.
*H04N 5/44* (2011.01)
(52) U.S. Cl. ................ 348/734; 345/169; 361/679.32
(58) Field of Classification Search .................. 348/552, 348/734, 839; 439/136, 152, 159; 715/718, 715/864; 345/169; 361/679.01–679.17, 361/679.32; D14/436
See application file for complete search history.

(56) References Cited

U.S. PATENT DOCUMENTS

| | | | | |
|---|---|---|---|---|
| 6,618,013 B1 * | 9/2003 | Aldous | | 343/702 |
| 6,665,741 B1 * | 12/2003 | Bronson | | 710/8 |
| D552,613 S * | 10/2007 | Tan | | D14/436 |
| 7,715,181 B2 * | 5/2010 | Raz | | 361/679.31 |
| 2004/0242041 A1 * | 12/2004 | Ngo | | 439/159 |
| 2006/0001930 A1 | 1/2006 | Yeh et al. | | |
| 2006/0023410 A1 * | 2/2006 | Solomon et al. | | 361/683 |
| 2006/0224779 A1 * | 10/2006 | Lu et al. | | 710/8 |
| 2006/0281491 A1 * | 12/2006 | Shih | | 455/558 |
| 2007/0008168 A1 * | 1/2007 | Liao et al. | | 340/825.69 |
| 2008/0168204 A1 * | 7/2008 | Sultenfuss et al. | | 710/301 |

FOREIGN PATENT DOCUMENTS

| | | |
|---|---|---|
| CN | 2826555 Y | 10/2006 |
| DE | 202006015679 U1 | 12/2006 |
| EP | 1447735 A2 | 8/2004 |
| JP | 2000236589 | 8/2000 |
| TW | 456724 | 9/2001 |
| TW | 556436 | 10/2003 |

(Continued)

OTHER PUBLICATIONS

English language translation of abstract of JP 2000236589 (published Aug. 29, 2000).

(Continued)

*Primary Examiner* — Scott Beliveau
*Assistant Examiner* — Patrick A Ryan
(74) *Attorney, Agent, or Firm* — Thomas, Kayden, Horstemeyer & Risley, LLP

(57) ABSTRACT

The television card with remote control module includes a 34 mm express card type TV card, a TV card remote control, and a connecting structure. The 34 mm express card type TV card has a TV card long side and a TV card short side, and a length of the TV card short side is 34 mm. The remote control has a remote control long side and a remote control short side, and a length of the remote control short side is smaller than or equal to 20 mm. The connecting structure could connect the TV card long side and the remote control long side to construct the television card with remote control module.

10 Claims, 3 Drawing Sheets

FOREIGN PATENT DOCUMENTS

| | | |
|---|---|---|
| TW | 200416521 | 9/2004 |
| TW | M 242955 Y | 9/2004 |
| TW | M248139 | 10/2004 |
| WO | WO 2010014042 A1 * | 2/2010 |

OTHER PUBLICATIONS

English language translation of abstract of TW M 242955Y (published Sep. 1, 2004).
English language translation of abstract of CN 2826555 Y (published Oct. 11, 2006).
English language translation of abstract of DE 202006015679 U1 (published Dec. 14, 2006).
English language translation of abstract of TW 456724 (published Sep. 21, 2001).
English language translation of abstract of TW 556436 (published Oct. 1, 2003).
English language translation of abstract of TW 200416521 (published Sep. 1, 2004).
English language translation of abstract of TW M248139 (published Oct. 21, 2004).

* cited by examiner

TELEVISION CARD WITH REMOTE CONTROL MODULE

RELATED APPLICATIONS

This application claims priority to Taiwan Application Serial Number 96123373, filed Jun. 27, 2007, which is herein incorporated by reference.

BACKGROUND

1. Field of Invention

The present invention relates to a TV card. More particularly, the present invention relates to a TV card with a mote control module.

2. Description of Related Art

Computers and their peripherals have become very popular in recent years. The functions and varieties of peripheral with computers have greatly increased. For example, using a computer to receive and display TV signals has become a popular computer application. Once a television card (TV card) is applied to a computer, cable or wireless TV program signals can be transformed into signals that can be displayed by a computer such that a computer user does not have to buy an extra TV for watching TV programs.

An express card type TV card is one of the common types of the TV cards. The express card has a 54 mm width type and a 34 mm width type, and the corresponding socket may also have 54 mm and 34 mm types. Most notebook computers are equipped with the 54 mm express card socket, which can also apply to the 34 mm express card and 54 mm express card.

The TV card cards are often operated with a TV card remote control, but the TV card remote controls are difficult to carry and are losable. Thus, there is a need for easily carrying the TV card remote control and to not lose it.

SUMMARY

The present invention provides a television card with remote control module. The television card with remote control module includes a 34 mm express card type TV card, a TV card remote control, and a connecting structure. The 34 mm express card type TV card has a TV card long side and a TV card short side, and a length of the TV card short side is 34 mm. The remote control has a remote control long side and a remote control short side, and a length of the remote control short side is smaller than or equal to 20 mm. The connecting structure could connect the TV card long side and the remote control long side to construct the television card with remote control module.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
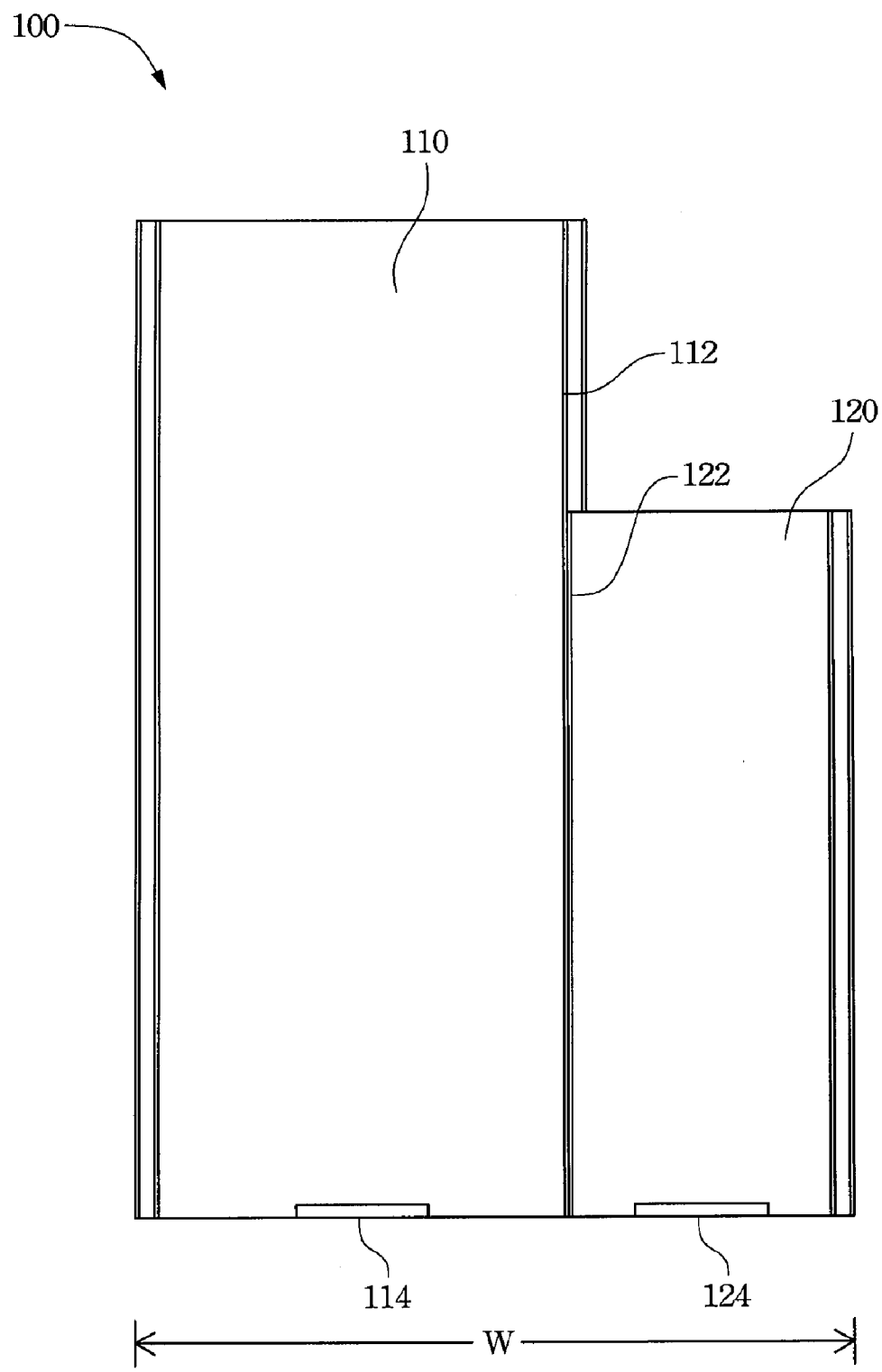
FIG. 1 is a schematic diagram of an embodiment of the television card with remote control module of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates a schematic diagram of an embodiment of the television card with remote control module of the invention. The television card with remote control module 100 includes a television card (TV card) 110, a remote control 120, and a connecting structure for connecting the TV card 110 and the remote control 120 to construct the television card with remote control module. The TV card 110 is a 34 millimeter (mm) express card type TV card. The TV card 110 has a TV card long side 112 and a TV card short side 114, and a length of the TV card short side 114 is 34 mm. The remote control 120 is a TV card remote control for controlling the TV card 110. The remote control 120 has a remote control long side 122 and a remote control short side 124. In this embodiment, a length of the TV card short side 124 is equal to 20 mm, thus a width W of the television card with remote control module 100 may equal to 54 mm.

Most computers, especially notebook computers, are equipped with the 54 mm express card socket, which can also apply to the 34 mm express card and 54 mm express card. The television card with remote control module 100 of this invention could be inserted into the 54 mm express card socket for easily carrying the remote control 120, reducing the space for placing the remote control 120, and reducing the possibility to lose the remote control 120.

Figure 2A:
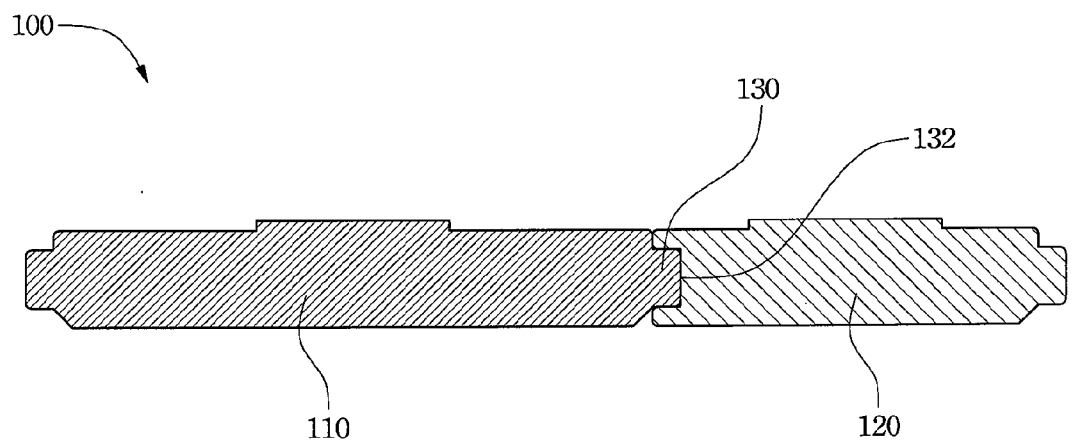
FIG. 2A and FIG. 2B are cross-section diagrams of embodiments of the television card with remote control module utilizing different connecting structures of the invention.

Refer to FIG. 1 and FIG. 2A simultaneously. FIG. 2A is a cross-section diagram of an embodiment of the television card with remote control module of the invention. In this embodiment, the length of the remote control short side 124 is equal to 20 mm, and a length of the remote control long side 122 is smaller than or equal to 53 mm. The connecting structure includes a flange 130 raised on the TV card long side 112 and a slot 132 disposed on the remote control long side 122. The flange 130 could couple with the slot 132 to connect the TV card 110 and the remote control 120 as the television card with remote control module 100.

Figure 2B:
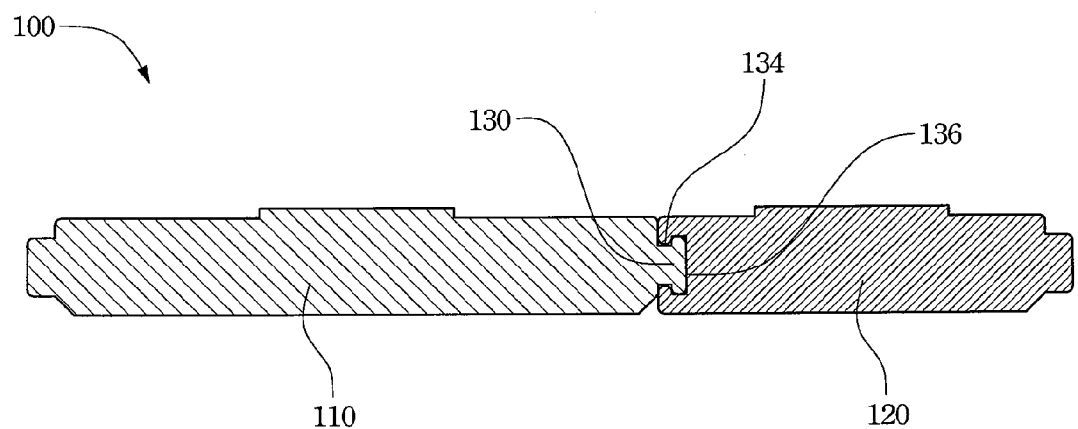

Refer to FIG. 1 and FIG. 2B simultaneously. FIG. 2B is a cross-section diagram of another embodiment of the television card with remote control module of the invention. In this embodiment, the length of the remote control short side 124 is equal to 20 mm, and the length of the remote control long side 122 is smaller than or equal to 53 mm. The flange 130 of the connecting structure may further have a neck 134, and the connecting structure further includes a slide rail 136 corresponding to the neck 134 disposed on the remote control long side 122 of the remote control 120. The flange 130 with the neck 134 could slide into the slide rail 136 and couple with the slide rail 136 for connecting the TV card 110 and the remote control 120 and preventing the TV card departing from the remote control 120.

Figure 3A:
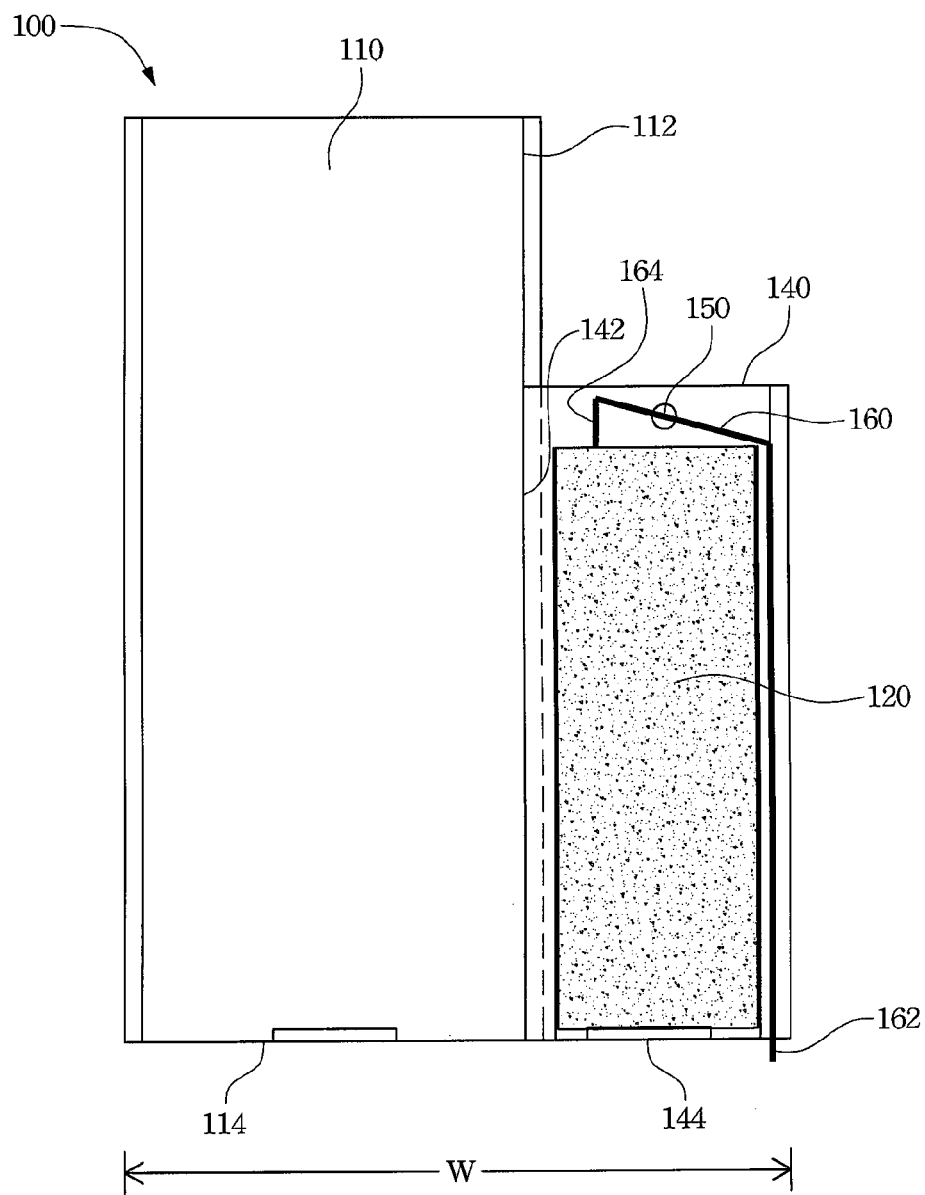
FIG. 3A and FIG. 3B are a cross-section diagram and a schematic diagram of another embodiment of the television card with remote control module of the invention.
Figure 3B:
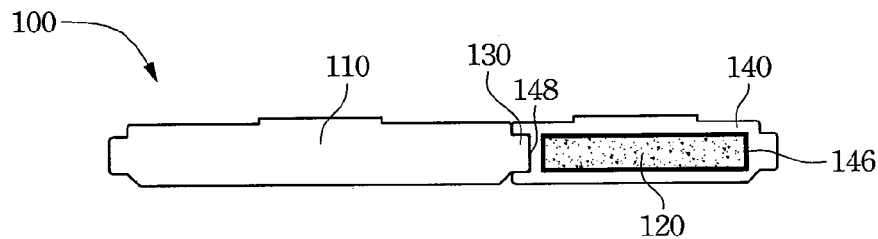

Refer to FIG. 3A and FIG. 3B simultaneously. FIG. 3A and FIG. 3B are a cross-section diagram and a schematic diagram of another embodiment of the television card with remote control module of the invention. The connecting structure includes a case 140 with a case long side 142 and a case short side 144. The remote control 120 may be contained in the case 140. In this embodiment, the TV card 110 is the 34 mm express card type TV card. The length of the remote control short side 124 is smaller than 20 mm, and the length of the case short side 144 is equal to 20 mm. The width W of the television card with remote control module is similar to 54 mm, and the length of the remote control long side 122 is smaller than or equal to 53 mm. The TV card 110 may have the flange 130, and the case long side 142 may have the slot 148 arranged corresponding to the flange 130. The flange 130 disposed on the TV card 110 could couple with the slot 142 disposed on the case 140 for connecting the TV card 110 and the case 140.

The case short side 144 of the case 140 may have an opening 146, and the case 140 may have a fulcrum 150 and a three-bar linkage. The three-bar linkage has a first bar 162, a second bar 164, and a middle bar 160. The middle bar 160 is pivoted on the fulcrum 150. The first bar 162 is extended from the opening 146 of the case 140. The second bar 164 touches an end opposite the opening 146 of the remote control 120. The first bar 162 could be pushed into the case 140, and then the middle bar 160 pivoted on the fulcrum 150 is inclined, thus the second bar 164 pushes the remote control 120, and the remote control 120 may be pushed out of the case 140 through the opening 146.

The television card with remote control module disclosed in the above embodiments could combine the 34 mm express card type TV card and the remote control, and the television card with remote control module could insert to the 54 mm type express card socket. Thus, the remote control could be carried easily and not easily lost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A television card with remote control module comprising:
   a 34 millimeter (mm) express card type television card (TV card) having a TV card long side and a TV card short side, and a length of the TV card short side is 34 mm;
   a television card remote control having a remote control long side and a remote control short side, and a length of the remote control short side is smaller than or equal to 20 mm; and
   a connecting structure for connecting the TV card long side and the remote control long side to construct the television card with remote control module.

2. The television card with remote control module of claim 1, wherein the television card with remote control module is inserted into an express card socket of a notebook computer, and the express card socket is a 54 mm express card socket.

3. The television card with remote control module of claim 1, wherein the length of the TV card short side is equal to 20 mm, and the connecting structure comprises a flange raised on the TV card long side.

4. The television card with remote control module of claim 3, wherein the connecting structure comprises a slot formed in the remote control long side, and the flange couples the slot for connecting the 34 mm express card type TV card and the TV card remote control.

5. The television card with remote control module of claim 3, wherein the flange has a neck, and the connecting structure comprises a slide rail corresponding to the neck disposed on the remote control long side, wherein the neck of the flange slides into the slide rail for connecting the 34 mm express card type TV card and the TV card remote control.

6. The television card with remote control module of claim 1, wherein the length of the remote control short side is smaller than 20 mm; the connecting structure comprises a flange raised on the TV card long side, a case for containing the TV card remote control, and a slot formed on the case; the case has a case long side and a case short side; a length of the case short side is equal to 20 mm, whereby the flange couples the slot for connecting the 34 mm express card type TV card and the TV card remote control.

7. The television card with remote control module of claim 6, wherein a length of the case long side is smaller than or equal to 53 mm.

8. The television card with remote control module of claim 6, wherein the case short side has an opening; the case has a three-bar linkage and a fulcrum; the three-bar linkage has a first bar, a second bar, and a middle bar, and the middle bar pivots on the fulcrum.

9. The television card with remote control module of claim 8, wherein the first bar extends from the opening of the case, and the second touches an end opposite the opening of the TV card remote control.

10. The television card with remote control module of claim 1, wherein a length of the remote control long side is equal to or smaller than 53 mm.

\* \* \* \* \*